United States Patent
Hart et al.

(10) Patent No.: US 10,452,993 B1
(45) Date of Patent: Oct. 22, 2019

(54) METHOD TO EFFICIENTLY APPLY PERSONALIZED MACHINE LEARNING MODELS BY SELECTING MODELS USING ACTIVE INSTANCE ATTRIBUTES

(71) Applicant: Symantec Corporation, Mountain View, CA (US)

(72) Inventors: Michael Hart, Farmington, CT (US); Chetan Verma, Sunnyvale, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 1138 days.

(21) Appl. No.: 14/694,967

(22) Filed: Apr. 23, 2015

(51) Int. Cl.
- *G06N 20/20* (2019.01)
- *G06N 20/00* (2019.01)
- *G06N 7/00* (2006.01)
- *G06F 16/13* (2019.01)

(52) U.S. Cl.
CPC ............ *G06N 20/00* (2019.01); *G06F 16/13* (2019.01); *G06N 7/005* (2013.01)

(58) Field of Classification Search
CPC ...... G06N 20/00; G06N 7/005; G06N 99/005; G06F 16/13; G06F 17/30091
See application file for complete search history.

(56) References Cited

U.S. PATENT DOCUMENTS

| | | | | |
|---|---|---|---|---|
| 8,370,280 B1* | 2/2013 | Lin | ....................... | G06N 99/005 706/12 |
| 8,825,853 B1* | 9/2014 | Konig | ............... | G06F 17/30867 707/E17.109 |
| 2005/0216426 A1* | 9/2005 | Weston | ................ | G06K 9/6215 706/12 |
| 2008/0233576 A1* | 9/2008 | Weston | ................ | C12Q 1/6883 435/6.12 |
| 2011/0099122 A1* | 4/2011 | Bright | .................... | G06Q 10/04 705/348 |
| 2013/0290110 A1* | 10/2013 | LuVogt | .................. | G06Q 30/02 705/14.66 |
| 2013/0290339 A1* | 10/2013 | LuVogt | ............. | G06F 17/30867 707/740 |
| 2014/0089411 A1* | 3/2014 | Rubin | ............... | G06F 17/30867 709/204 |

(Continued)

OTHER PUBLICATIONS

Personalized Recommendation on Dynamic Content Using Predictive Bilinear Models—2009 Chu et al.*

(Continued)

*Primary Examiner* — Luis A Sitiriche
*Assistant Examiner* — Ababacar Seck
(74) *Attorney, Agent, or Firm* — Maschoff Brennan

(57) ABSTRACT

A method for applying personalized machine learning models is provided. The method includes producing one or more feature vectors that represents features of one of a plurality of files of a file system and selecting, from a plurality of personalized machine learning models that model user accesses to the files of the file system a subset of the personalized machine learning models each of which has a plurality of non-zero weights corresponding to non-zero features of the one or more feature vectors. The method includes determining from the subset of personalized machine learning models which users of a plurality of users of the file system are likely to access the one of the plurality of files.

20 Claims, 8 Drawing Sheets

(56) References Cited

U.S. PATENT DOCUMENTS

| | | | | |
|---|---|---|---|---|
| 2014/0090061 | A1* | 3/2014 | Avasarala | G06F 21/56 726/24 |
| 2014/0358826 | A1* | 12/2014 | Traupman | G06N 5/048 706/11 |
| 2014/0358828 | A1* | 12/2014 | Phillipps | G06N 99/005 706/12 |
| 2015/0170053 | A1* | 6/2015 | Miao | G06N 20/00 706/12 |
| 2015/0220999 | A1* | 8/2015 | Thornton | G06Q 30/0201 705/14.66 |
| 2016/0055236 | A1* | 2/2016 | Frank | G06F 17/30702 707/748 |

OTHER PUBLICATIONS

User Profiles for Personalized Information Access Gauch et al.—2007.*
Google News Personalization: Scalable Online Collaborative Filtering—2007.*
File Access Prediction with Adjustable Accuracy—2002.*
Probabilistic Models for Personalizing Web Search 2012 Sontag et al.*
File Access Prediction with Adjustable Accuracy (Year: 2002).*

* cited by examiner

US 10,452,993 B1

METHOD TO EFFICIENTLY APPLY PERSONALIZED MACHINE LEARNING MODELS BY SELECTING MODELS USING ACTIVE INSTANCE ATTRIBUTES

BACKGROUND

Recommendation systems apply one or more models and analyze results to make recommendations. These can be static models for simpler systems, or machine learning models for dynamic and/or complex systems. Examples of recommendation systems in use today include ones used in online shopping, which display products that others have viewed, or other products in a similar classification or from other manufacturers. Such systems are efficient for employing a small number of models, but experience ever-increasing computation time when the number of models is large or growing. Consider a recommendation system where there are N users and a corresponding number of models, and M items to consider. Applying each of the N user models on one item X of the M items requires N times as much computation time as applying a single model on the item, and applying each of the N user models on all M items requires N times M as much computation time as applying a single model on the item. For large numbers of models, and also for large numbers of items, the total computation time can be extremely large and can render certain techniques infeasible.

It is within this context that the embodiments arise.

SUMMARY

In some embodiments, a method, performed by a processor, for applying personalized machine learning models is provided. The method includes producing one or more feature vectors that represents features of one of a plurality of files of a file system and selecting, from a plurality of personalized machine learning models that model user accesses to the files of the file system a subset of the personalized machine learning models each of which has a plurality of non-zero weights corresponding to non-zero features of the one or more feature vectors. The method includes determining from the subset of personalized machine learning models which users of a plurality of users of the file system are likely to access the one of the plurality of files.

In some embodiments, a tangible, non-transitory, computer-readable media having instructions thereupon which, when executed by a processor, cause the processor to perform a method. The method includes generating one or more feature vectors based on one file of a plurality of files of a file system, wherein the one or more feature vectors represents features of the one file and analyzing, relative to the one file, a plurality of personalized machine learning models, each of which models user accesses to the files of the file system for a specified user. The method includes determining, based on the analyzing, which personalized machine learning models of the plurality of personalized machine learning models have a threshold amount of non-zero weights associated with non-zero features of the one or more feature vectors. The method includes producing a score for each of the personalized machine learning models so determined, based on application, to the one or more feature vectors of the one file, of the personalized machine learning models so determined and determining which users are likely to access the one file, based on scores so produced.

In some embodiments, a machine learning model filtering system is provided. The system includes a data structure, configured to hold a plurality of personalized machine learning models, each of which models, for a particular user, user accesses to files of a file system. The system includes a feature vector generator, configured to generate at least one feature vector for each of a plurality of files of the file system and a filtering module, configured to select which subset of the plurality of personalized machine learning models to apply to the at least one feature vector of one file of the plurality of files, based on correlation of non-zero feature values of at least one feature vector of the one file to non-zero weights of the plurality of personalized machine learning models. The system includes a scoring module, configured to determine a score for each personalized machine learning model of the subset as applied to the at least one feature vector of the one file and an access prediction module, configured to determine which users are likely to access the one file, based on scores from the scoring module.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A file navigation assistance system, which models user accesses to files and assists users in finding files, is described with reference to FIGS. 1-5. The system monitors user accesses of files in a file system, and trains models based on results of the monitoring. Then, the system applies one or more models to predict which files would be of interest to a user. These files are presented to the user in a user interface, which supports quick access to the proposed or recommended files. This spares the user from having to navigate a hierarchical file system to find a file, although such capability may be preserved and available. In some embodiments, system results can be used to detect risky or malicious user activity.

A machine learning model filtering system, which filters machine learning models and selects a subset of machine learning models, is herein described with reference to FIGS. 6 and 7. Although other applications for the machine learning model filtering system can be devised, embodiments are disclosed as coupled to, cooperating with, or integrated with the file navigation assistance system, or otherwise making use of the machine learning models that model user accesses to files in a file system. The machine learning model filtering system filters these user access models, selects and applies a subset of them to predict which users are likely to access a particular file. In so doing, the machine learning model filtering system implements a classification scheme which act as a pre-processing step to prevent applying models on a file that correspond to users who are determined to be unlikely to access the file. Results of this process can be used to guide representation of a file to a user or to each of multiple users. Or, in some embodiments, these results can be used for comparison with user activity, to refine models and/or to detect risky or malicious user activity.

Figure 1:
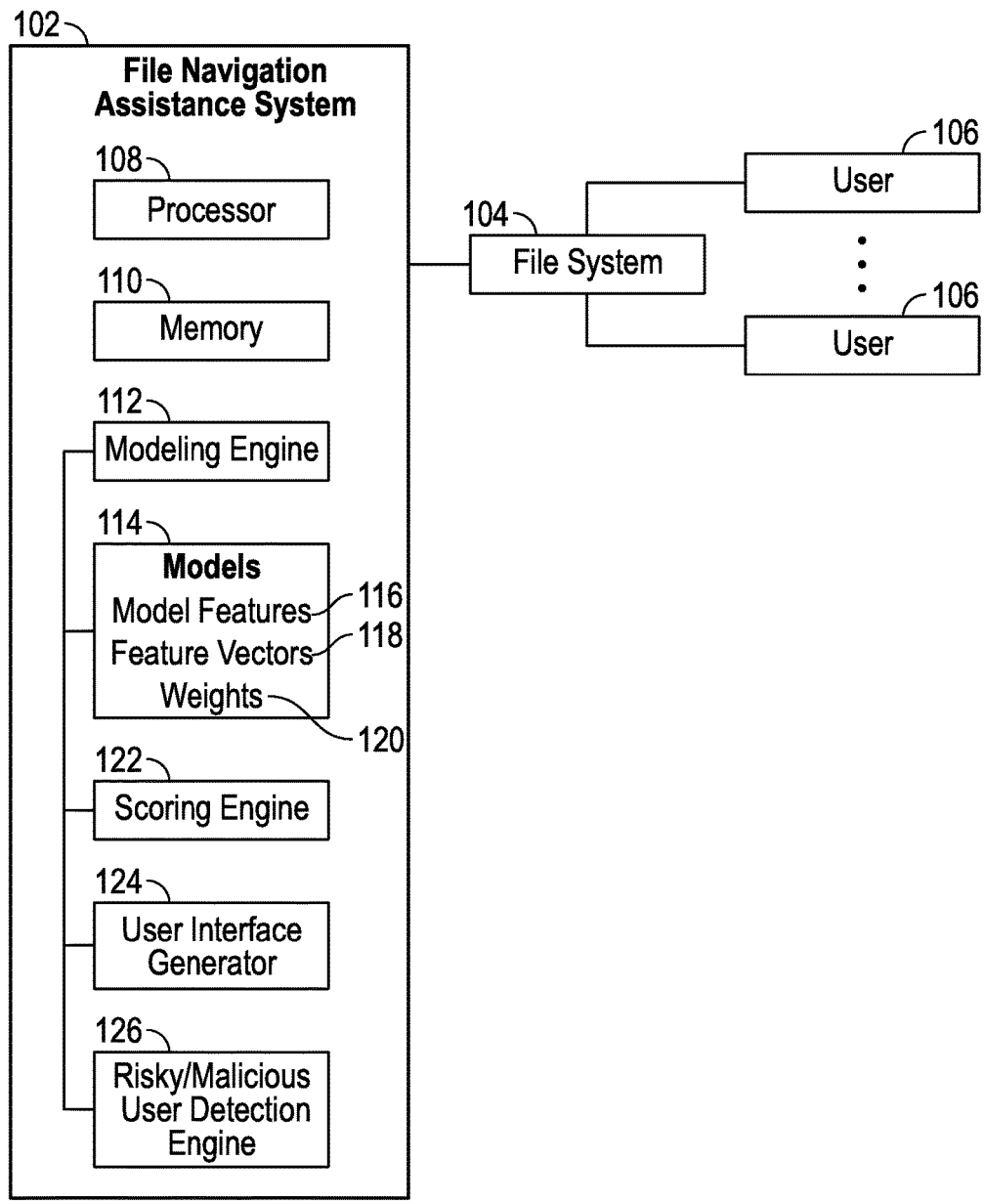
FIG. 1 is a block diagram of a file navigation assistance system that predicts which files may be of interest to a user, in accordance with some embodiments.

FIG. 1 is a block diagram of a file navigation assistance system 102 that predicts which files may be of interest to a user, in accordance with the present disclosure. In various embodiments, the file navigation assistance system 102 could be implemented in a computing device that has a processor 108 and memory 110, such as a server. In some embodiments, the file navigation assistance system 102 could be integrated with a file server or sit separately from the file server in a network as a network appliance, or other location that can communicate with a file system 104 and observe or monitor accesses to files by users 106. For example, the file system 104 could send messages or stream metadata or otherwise communicate with the file navigation assistance system 102, concerning the file accesses. Alternatively, the file navigation assistance system 102 could pull such information from the file system 104.

Although variations of the present embodiments are readily devised, the embodiment of the file navigation assistance system 102 shown in FIG. 1 has a modeling engine 112, models 114, a scoring engine 122, a user interface generator 124, and in some embodiments a risky or malicious user detection engine 126. The modeling engine 112 produces and trains various models 114, based on monitoring user 106 accesses to files of the file system 104. In some embodiments, the models 114 have various model features 116, and are trained using feature vectors 118 to develop various weights 120 in the models 114. The scoring engine 122 scores individual files, using one or more of the models 114. Representations (e.g., file names, icons) of files whose scores indicate that a file is predicted of interest to a user are passed to the user interface generator 124, which displays or presents these representations of the proposed or recommended files to the user. The user is then able to access these proposed or recommended files directly via this user interface, without having to navigate up and down through directories in the file system 104 (e.g., via a conventional file system navigation tool) or look through long lists of files or directories.

Figure 2:
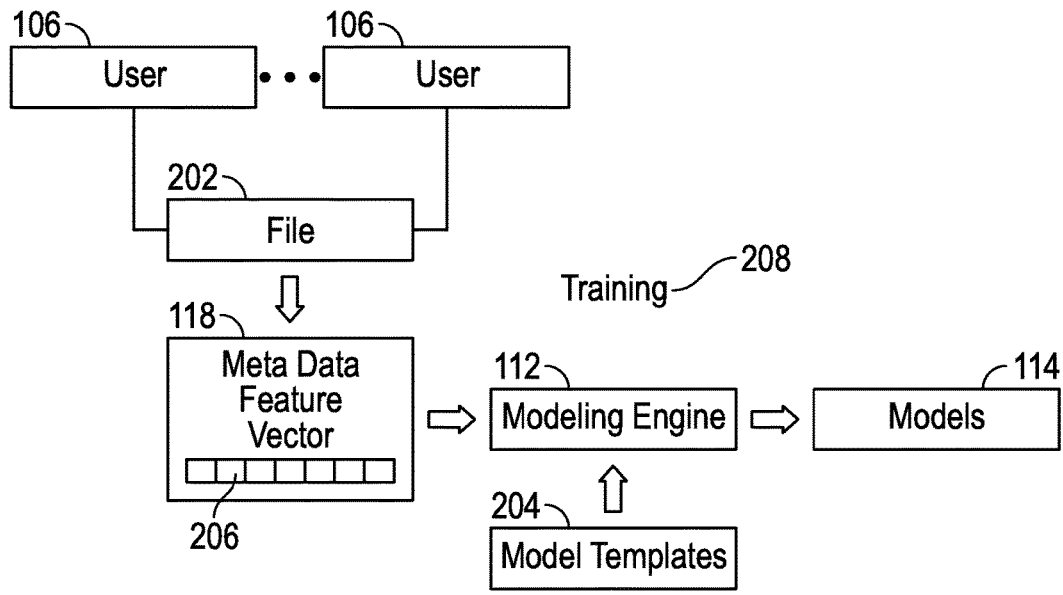
FIG. 2 is a system action diagram depicting training to produce models based on user accesses of files in accordance with some embodiments.

FIG. 2 is a system action diagram depicting training 208 to produce models 114 based on user accesses of files 202. From a file 202, and accesses to the file 202 by one or more users 106, one or more metadata feature vectors 118 are generated by the modeling engine 112. Feature vectors 118 are further discussed with reference to FIGS. 4A-4D, which show various examples. The modeling engine uses model templates 204, and trains the model templates 204 with the metadata feature vector(s) 118, to produce the models 114. In various embodiments, the models 114 are individualized with a model 114 produced for each user, and/or for each group or set or subset of users, and various combinations thereof. Sets or subsets of users could overlap, with models 114 produced accordingly. There are many models and types of models available, and appropriate model templates 204 for one or more models 114 are readily devised by the person skilled in the art. For example, the models 114 could include at least one linear model, feature learning model, logistic regression model, factorization model, clustering model, support vector machines model, factorization machines model, decision trees model, random forest model, classifier model or naïve Bayes classifier model. It should be appreciated that the term "model" is used herein in both a specific, individual sense and a collective sense, in that a model or type of model could include multiple models.

Figure 3:
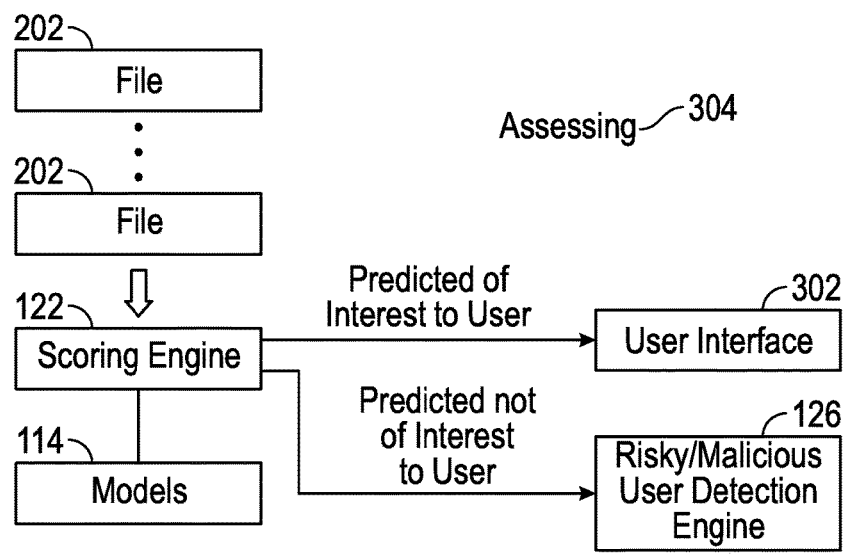
FIG. 3 is a system action diagram depicting assessing whether a file is predicted to be of interest to a user based on one or more of the models in accordance with some embodiments.

FIG. 3 is a system action diagram depicting assessing 304 whether a file 202 is predicted to be of interest to a user 106 based on one or more of the models 114. The scoring engine 122 performs the assessing 304 on various files 202, producing a score for each file 202. The assessing 304 could be performed sequentially, e.g., one file 202 at a time, or in batches or in parallel or combinations thereof. To perform the assessing 304, the scoring engine 122 applies one or more models 114 to one or more feature vectors 118 of the file 202 of interest, and generates a score. Depending on the scoring scale, whichever scores or ranges of scores are consistent with a positive correlation of user accesses to the file 202 are indicative that the file 202 is predicted to be of interest to the user 106. Whichever scores or ranges of scores are consistent with zero or low or negative correlation (i.e., anti-correlation) of user accesses to the file 202 are indicative that the file 202 is predicted to not be of interest to the user 106. Anti-correlation is especially indicative that the user would not be interested in the file 202 and may even actively avoid looking for the file 202 or accessing the file 202. Examples of correlations and anti-correlations are discussed below with reference to examples of feature vectors. One or more thresholds for the score could be adjustable and determine the size of the number of files 202 that are found predicted of interest to the user 106 or presented to the user 106.

Files 202 that are predicted of interest to the user are presented in the user interface 302. An example user interface is discussed below with reference to FIG. 5. Files 202 that are predicted to not be of interest to the user 106 are not presented in the user interface 302. In embodiments with a risky or malicious user detection engine 126, findings regarding both types of files 202 (i.e., files 202 predicted to be of interest to the specific user 106 and files 202 predicted to not be of interest to the specific user 106) are reported by the scoring engine 122 to the risky or malicious user detection engine 126. The risky or malicious user detection engine 126 monitors user accesses to files 202, and alerts when a user 106 accesses greater than a threshold number of files 202 that are predicted to not be of interest to that particular user 106. In other words, the risky or malicious user detection engine 126 monitors for unexpected or unpredicted user access behavior or patterns. Various further algorithms besides looking for a threshold number of such accesses can be devised, using the models 114 and results of the scoring engine 122.

Figure 4A:
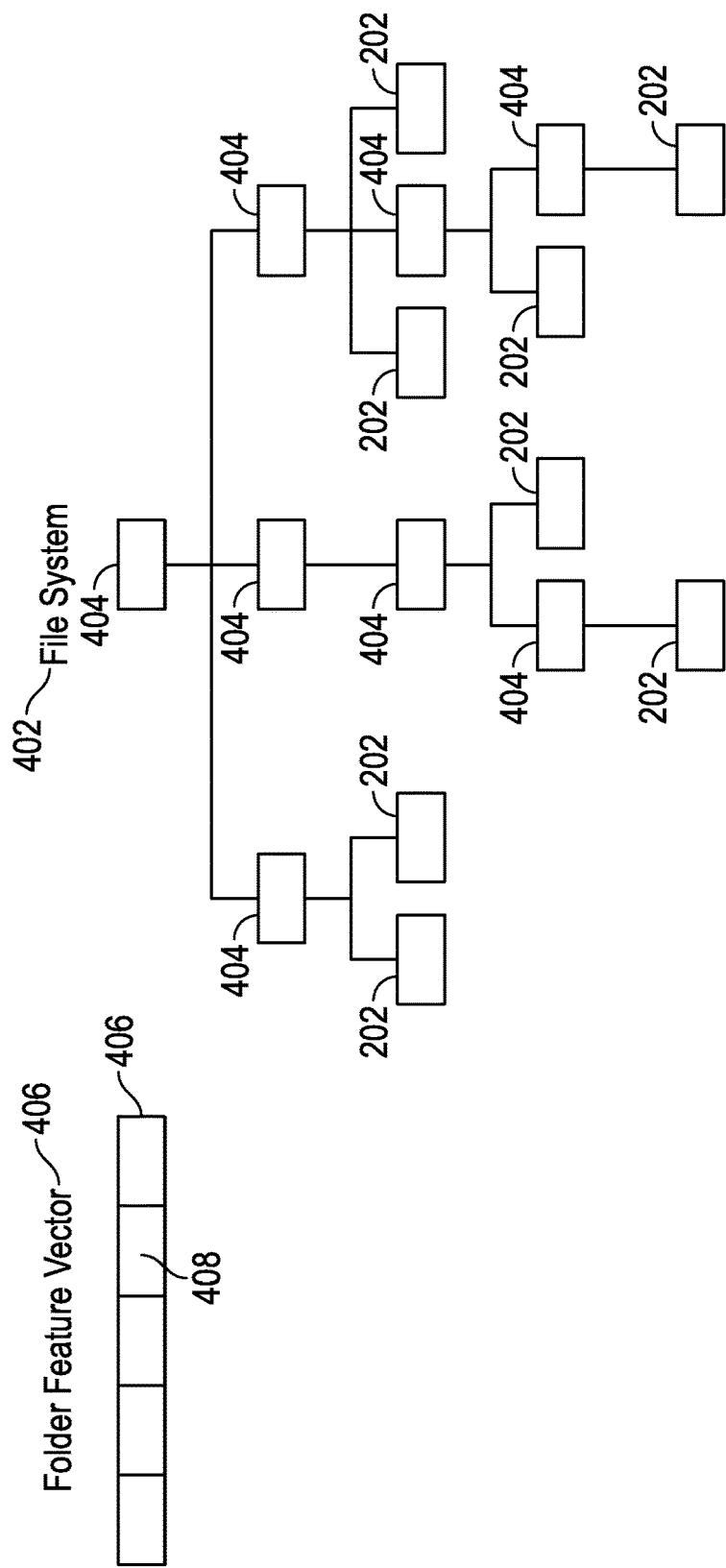
FIG. 4A shows a folder feature vector, which represents features of a file relative to folders in a file system, and which can be used for training models in the file navigation assistance system of FIG. 1, as depicted in FIG. 2 in accordance with some embodiments.

FIG. 4A shows a folder feature vector 406, which represents features of a file 202 relative to folders 404 in a file system 402, and which can be used for training 208 models 114 in the file navigation assistance system 102 of FIG. 1, as depicted in FIG. 2. The terms "folder" and "directory" are herein used interchangeably. The folder feature vector 406 represents aspects of folders, relative to a specific file 202. In one example, the value of a particular entry 408 (e.g., a field) in the folder feature vector 406 is "1" if a corresponding folder 404 is an ancestor of file 202 in the file system hierarchy. This enables the model 114 to capture which folders 404 are in the absolute file path of the file 202 (e.g., in the file pathname), and the closeness between folders 404 with respect to the folder hierarchy in the file system 402.

Figure 4B:
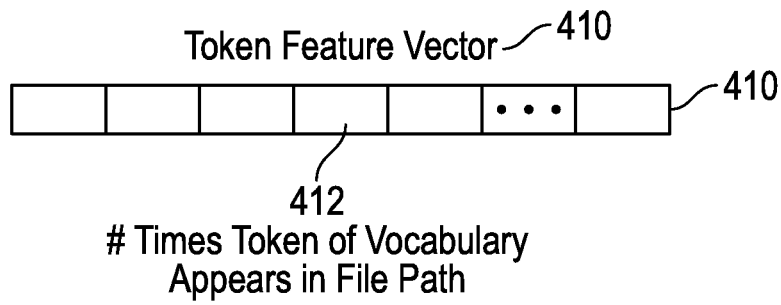
FIG. 4B shows a token feature vector, which represents the number of times a token of vocabulary appears in a file path of a file, and which can be used for training models in the file navigation assistance system of FIG. 1, as depicted in FIG. 2 in accordance with some embodiments.

FIG. 4B shows a token feature vector 410, which represents the number of times a token of vocabulary appears in a file path of a file 202, and which can be used for training 208 models 114 in the file navigation assistance system 102 of FIG. 1, as depicted in FIG. 2. The token feature vector 410 has a length (e.g., number of entries 412 or fields) equal to the number of tokens in a token vocabulary, in some embodiments. For example, each token could be a word, text string, number or special character that appears in one of the folder names (or directory names) or file names. An entry 412 (e.g., a field) in the token feature vector 410 corresponds to a token and has a value corresponding to the number of times the token appears in each of the folders in the file path of the file 202, and in the file name. This enables the model 114 to capture presence of tokens of interest in user accesses.

Figure 4C:
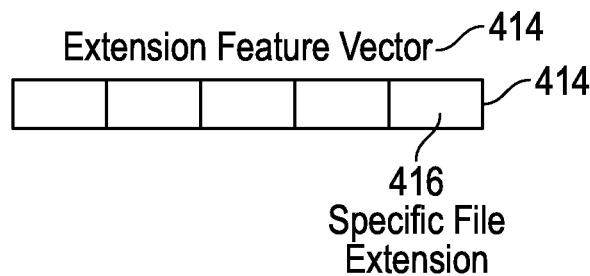
FIG. 4C shows an extension feature vector, which represents the specific file extension of a file, and which can be used for training models in the file navigation assistance system of FIG. 1, as depicted in FIG. 2 in accordance with some embodiments.
Figure 4D:
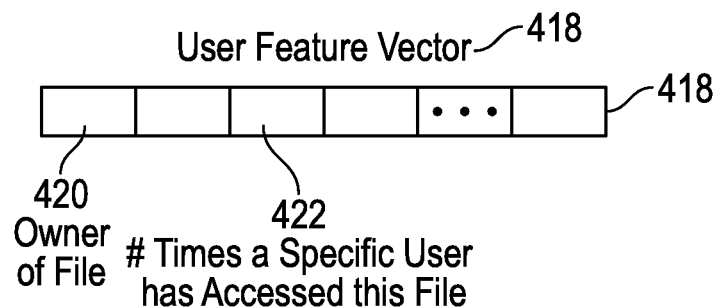
FIG. 4D shows a user feature vector, which represents the owner of a file, and the number of times a specific user has accessed this file, and which can be used for training models in the file navigation assistance system of FIG. 1, as depicted in FIG. 2 in accordance with some embodiments.

FIG. 4C shows an extension feature vector 414, which represents the specific file extension of a file 202, and which can be used for training 208 models 114 in the file navigation assistance system 102 of FIG. 1, as depicted in FIG. 2. The extension feature vector 414 has a length equal to the total number of possible file extensions (e.g., one entry 416 or field for each of .doc, .txt, .exe, .tmp, .wav, .pdf, .jpg, .mpg, .sys, .ini, .xml, .htm, .dll, .log, etc.) in some embodiments. The value of a particular entry 416 (e.g., a field) of the extension feature vector 414 may be a "1" if the file 202 has the file extension corresponding to that entry 416, otherwise the value is a "0". It should be appreciated that this feature enables the model 114 to capture user preferences for certain file types (e.g., as differentiated by file extensions). Negative weights 120 in a model 114 could correspond to a user 106 showing non-use of files with specified file extensions. For example, a specific user 106 who never accesses .log files would have a negative weight 120 in the individualized machine learning model 114 for that user 106, with the position of that negative weight 120 in the model 114 corresponding to the location of the entry 416 in the extension feature vector 414 that codes for the .log file extension. Further feature vectors 118 and weights 120 operate in a similar manner FIG. 4D shows a user feature vector 418, which represents the owner of a file 202, and the number of times a specific user 106 has accessed this file 202, and which can be used for training 208 models 114 in the file navigation assistance system 102 of FIG. 1, as depicted in FIG. 2. The extension feature vector 414 has a length equal to the number of users of the file system 104 plus one (e.g., to record the file owner), in some embodiments. One entry 420 in the user feature vector 418 has a value that represents the owner of the file 202. Other entries 422 in the user feature vector 418 represent the number of times a specific user 106 has accessed the file 202, with each entry 422 corresponding to one of the users 106. This enables the model 114 to capture relationships among users 106 for file accesses, such as which files 202 are popular among multiple users 106 or among which specific users 106. For example, negative weights 120 in the model 114 could correspond to users who own files that a specific user 106 does not access or accesses less often than when the corresponding user features have positive weights 120 in the model 114. In some embodiments, the user feature vector 418 can represent membership of individual users 106 to groups, departments, organizations, teams, etc., which enables the model 114 to capture relationships among sets of users 106 for file accesses. In some embodiments, the user feature vector 418 can represent triangle counts, which relate to collaboration among users. For example, user i and user j are connected by an edge if they accessed at least one file in common (e.g., one edge connects the two users, one edge connects one user to the file, and one more edge connects the other user to the file, thus a triangle is formed conceptually).

Other types of feature vectors 118 are readily devised, to capture various further relationships and aspects of files 202 and file accesses by users 106. Variations on the above feature vectors 406, 410, 414, 418, with various entries 408, 412, 416, 420, 422 in various sequences and with various values are readily devised. Various models 114 can represent various model features 116 with various feature vectors 118 and develop various weights 120 in response to the training 208 depicted in FIG. 2. Various formats can be used for feature vectors 118 and models 114. Multiple feature vectors 118 could be used, or a single, larger feature vector could combine entries that would have been in multiple feature vectors. Recommender systems, text classification systems, and categorical feature systems may have sparse feature vector representations, which may be advantageous for this system.

Figure 5:
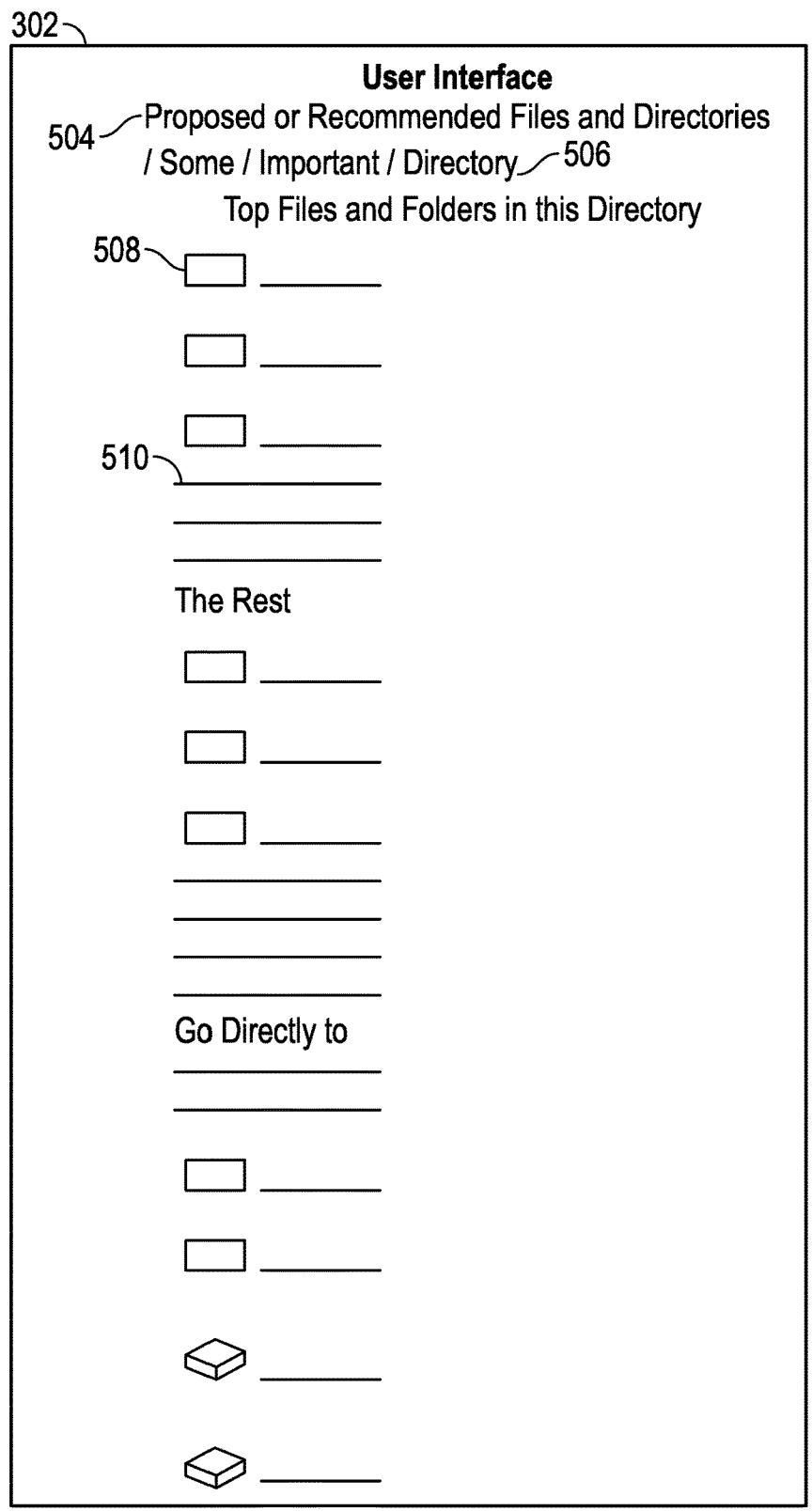
FIG. 5 is an example of a user interface that presents proposed or recommended files and directories to a user, based on the models and the assessing as shown in FIG. 3 in accordance with some embodiments.

FIG. 5 is an example of a user interface 302 that presents proposed or recommended files and directories to a user, based on the models 114 and the assessing 304 as shown in FIG. 3. The example user interface 302 is generated by the user interface generator 124, and presented to a user 106, e.g., via a network and a user device, such as a computer, or a computing and communication device, with a viewscreen. In the user interface 302, a message 504 informs the user, for example that proposed or recommended files and directories are represented in the user interface 302. An example directory 506 is shown as "/SOME/IMPORTANT/DIRECTORY", and folders 508 and files 510 that the file navigation assistance system 102 predicts of interest to the user 106 are represented (e.g., by icons or text, etc.) in the user interface 302. In this example, the remaining files and folders in the directory are shown under another message, such as "THE REST". Also in this example, further files and folders are represented under another message such as, "GO DIRECTLY TO". Each of the files 510 or folders 508 shown in this user interface 302 are accessible directly, for example by a single click, a double-click, a selection, or hovering a cursor, etc., so that the user does not need to navigate through a hierarchical file system 402 (e.g., as depicted in FIG. 4A) by going up and down through a directory structure.

With reference to FIGS. 1-5, some operating scenarios and aspects of the file navigation assistance system 102 are described below. The file navigation assistance system 102 functions as a personalized file navigation system. In order to help knowledge workers manage a flood of data, the system can mine file access patterns across users and assist users in discovering relevant files, folders and user activities, and assist users in efficiently navigating to these items that are relevant to the user. One phase of operation of the system is the monitoring of user activity and updating personalized file activity models. A personalized user activity model per user models the user's activities in terms of multiple attributes. The model can be updated constantly or intermittently, based on user activities and the types of files or folders accessed. Multiple algorithms can be leveraged to update the personalized models after each user activity or after a time interval. Choosing which algorithm with which to update the models may depend on available resources, rate of file activity, modeling complexity, and performance requirements. Alternatively, it may be feasible to retrain models over a recent window, at specified time intervals. Parameters which determine window width and time to retrain models may be fixed or adaptive based on user activity. For example, more user activity may require a small window separating the update or retraining of the activity models.

In order to model user activity, information is extracted from files, folders or locations accessed by users in some embodiments. Such information may include (A) path name and names of files accessed by users, (B) file extensions, (C) folders, (D) locations of folders in a file system, (E) user(s) who created or edited the file, (F) user groups, team affiliations of users, (G) user(s) who recently accessed the file, (H) user group, or team affiliations of users, (I) size of file, (J) content of the file, (K) categorization of type of file based on available concept detectors or classifiers, and other aspects of the files and user activities.

One phase of operation of the system is training so that the model can capture the data access patterns. From a set of files accessed and not accessed by a user, one or more feature vectors are produced, and used for training, resulting in a trained model for the user that captures the file access patterns of the user. A trained model per user can help understand whether or not an activity is relevant to a user and hence must be discovered or must be easily accessed by the user. Another phase of operation of the system is determination of relevance of a file, folder, file hierarchy subtree or activity for a user. Some modeling approaches assign binary yes/no labels as a type of score to each new activity based on whether or not it is of relevance to a user. Other modeling approaches provide a numerical score (e.g. a probability) for each activity, so that a convenient threshold can be chosen to select the most relevant activities and tune the number of activities presented to the user so as not to overwhelm the user but still cover important activities of relevance. Based on probabilities or confidence scores assigned to user activities by constructed models, ranks can be assigned items such as files and folders so that a user can easily navigate to items of relevance to the user.

One phase of operation of the system is assisting the user. Once the relevance of activities has been calculated by the model and the relevant activities for a user have been selected, the phase of assisting the user is concerned with summarizing the activities in folders based on their relevance. For example, the most relevant folders and files to a specific user could be highlighted near the top of a user interface. The user interface can assist the user to access the files or folders that are relevant to the user, for example by modifying a file explorer so that the user can reach the files or folders through a lesser number of actions such as clicks. Relevant activities can be aggregated based on their attributes as discussed above. For example the popular keywords in files that are most relevant in a specific folder can be used to summarize the relevant activities in the location. The knowledge of relevance of different file activities can be used to enable users to access relevant content faster. For example, the files and folders can be sorted based on their relevance to a certain user, permitting the user to click on the most important content without having to sift through all the files or folders in any location. In addition to using the existing organization of files, a personalized set of folders can be recommended to users, consisting of relevant files or folders grouped together based on their content or other attributes. Links to relevant items such as files, folders, or calendar invites can be used for easy navigation.

Based on user response to the system, it is possible to incorporate explicit or inferred user feedback to update the models. For example, if a user rarely clicks on files or folders that the model proposes are of relevance to the user, this can be used to provide a negative feedback, thereby informing the model learning process to adjust model parameters accordingly. In some embodiments, collaborative filtering is used. Predictions from other users' models are utilized to make "smarter" predictions. Here, user metadata models for multiple users are applied to modify feature vectors for validation files. This is followed by further model training, to produce a collaborative filtering aware model for a specific user. Training and test periods can be varied in some embodiments. By studying the variation of system performance with training duration and the separation between training and testing, knowledge workers can tune various parameters so as to achieve greater precision and reduce false positives that users discard or fail to respond to.

In order for the system to predict files accessed by users, and not base the predictions on scripts or programs performing access, scripted activity should be removed from consideration in some embodiments. Typically, automatic file accesses occur in bursts. To remove bursts of activities from consideration for training or scoring, the number of activities and the span of time over which repeated activities occur are recorded for each user. The bursts can be removed through analysis of such activities, for example by using Tukey's outlier factor.

Insights can be gained from feature analysis. Regarding the file extension features, the file extension provides valuable prediction, but many of the extensions have negative weights 120 in the trained models. This corresponds to users not using files with particular extensions. Regarding user features, correlation among users and accesses provides valuable prediction. For example, when two users have accessed the same file, other files that the one user accesses often prove to be of interest to the other user. Anti-correlation is also seen between certain users. For example, two users that do not show accesses to each other's files usually continue to not access each other's files. Certain users are seen as exemplar users, and appear in the top features of many models in some embodiments.

Figure 6:
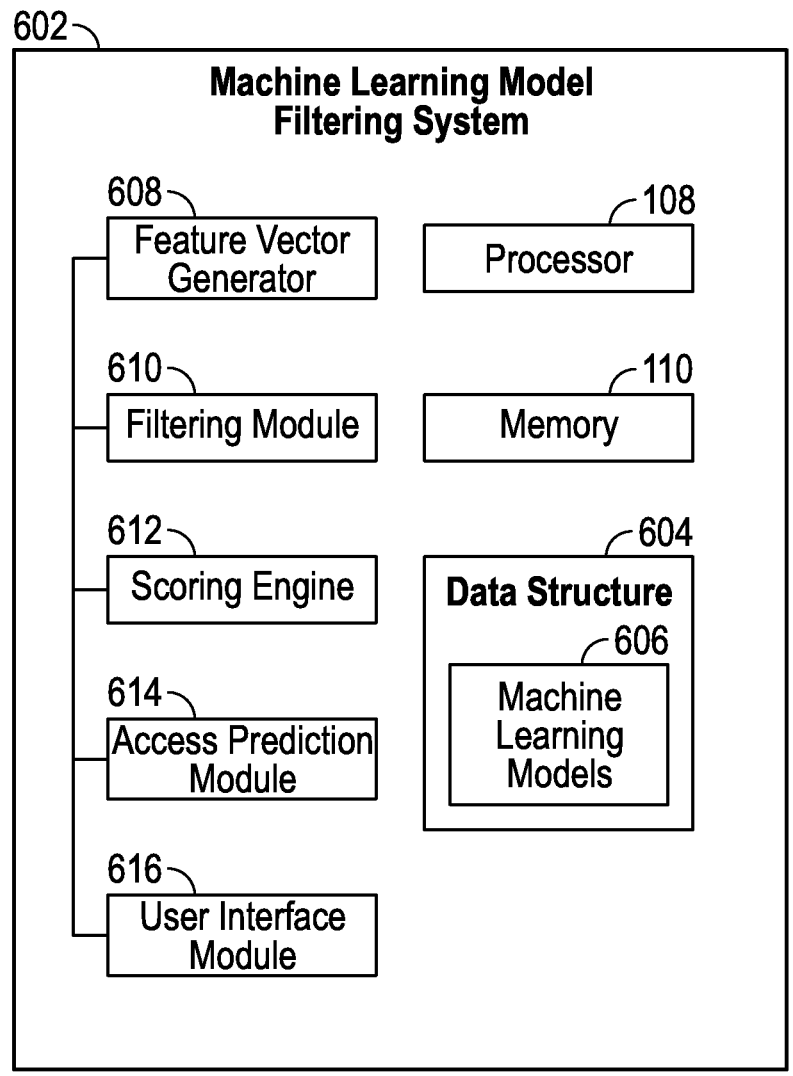
FIG. 6 is a block diagram of a machine learning model filtering system, which filters or selects a subset of the models produced by the file navigation assistance system of FIG. 1, and applies the subset of models to predict which users are likely to access a specific file, in accordance with some embodiments.

FIG. 6 is a block diagram of a machine learning model filtering system 602, which filters or selects a subset of the models 114 produced by the file navigation assistance system 102 of FIG. 1, and applies the subset of models 114 to predict which users 106 are likely to access a specific file 202, in accordance with an embodiment of the present disclosure. In various embodiments, the machine learning model filtering system 602 could be implemented in a computing device that has a processor 108 and a memory 110, such as a server. The machine learning model filtering system 602 could be integrated with a file server or sit separately from the file server in a network as a network appliance, or other location that can communicate with a file system 104 and observe or monitor accesses to files by users 106. The machine learning model filtering system 602 may communicate with or be integrated with the file navigation assistance system 102 and make use of the user access monitoring and other facilities of the file navigation assistance system 102.

Although variations of the present embodiments are readily devised, the embodiment of the machine learning model filtering system 602 shown in FIG. 6 has a feature vector generator 608, a filtering module 610, a scoring engine 612, an access prediction module 614 and a user interface module 616. A data structure 604 holds machine learning models 606, which could include or be the models 114 of the file navigation assistance system 102, or variations or derivations therefrom. For example, the data structure 604 could be a database, a list, a set of mathematical, logical or algorithmic expressions or rules, etc. The feature vector generator 608 generates feature vectors 118, as described above with reference to FIG. 1 and FIGS. 4A-4D. In some embodiments, the feature vector generator 608 is shared with or belongs to the file navigation assistance system 102, in which case the filtering module 610 could obtain the feature vectors 118 from the file navigation assistance system 102. The filtering module 610 determines which of the machine learning models 606 are best applicable to the feature vector(s) 118 for a specified file 202, in a manner that will be further discussed with reference to FIG. 7. The scoring engine 612 applies the subset of machine learning models 606 determined by the filtering module 610 to the feature vector(s) 118 for the specified file 202, and cooperates with the access prediction module 614. The access prediction module 614 analyzes scores produced by the scoring engine 612, and produces information about which users are predicted likely to access the specified file 202, based on associations of the users and the models 114. Results of the access prediction module 614 are presented via the user interface module 616, or communicated to the risky or malicious user detection engine 126 of the file navigation assistance system 102, in some embodiments.

Figure 7:
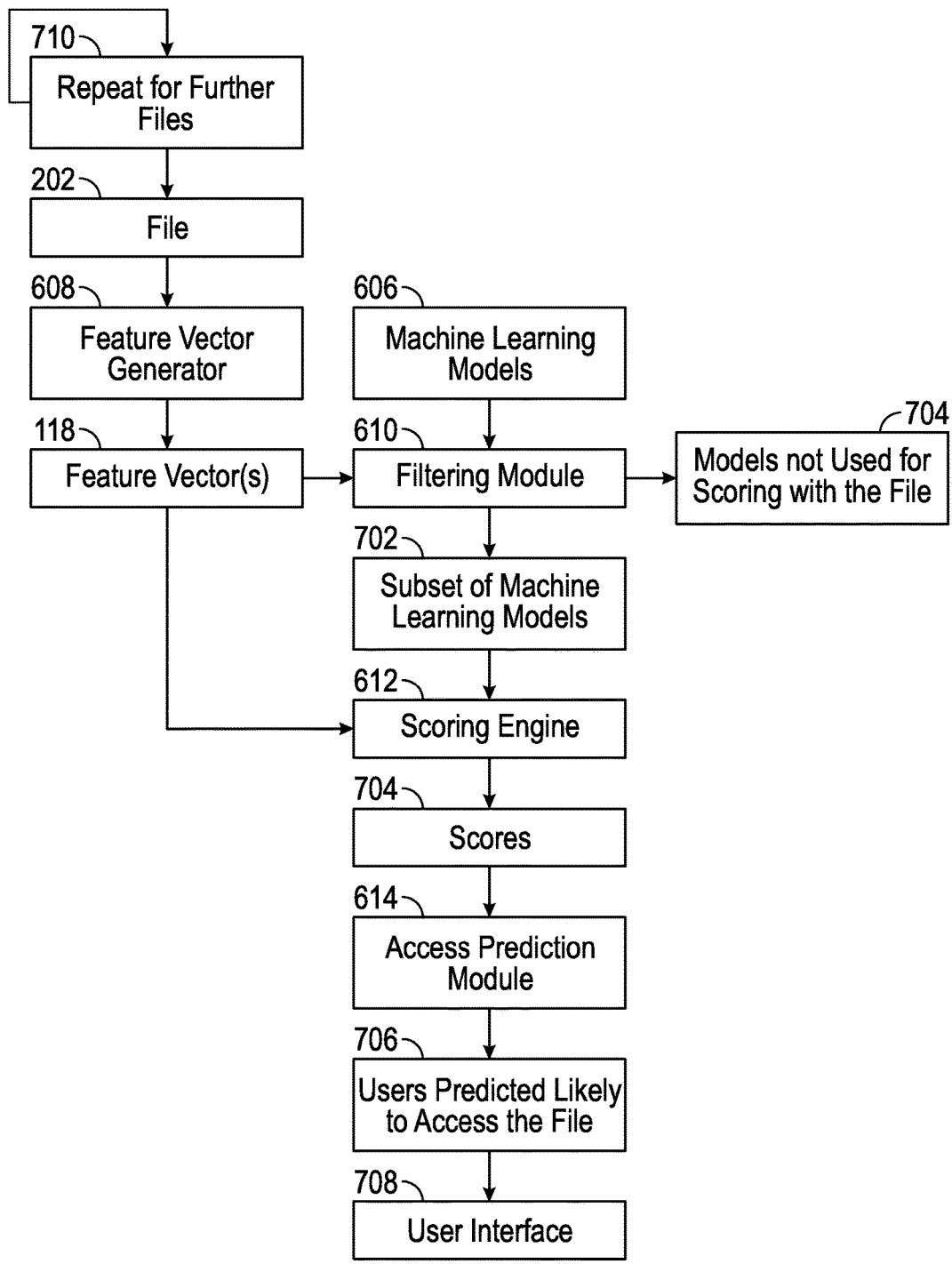
FIG. 7 is a system action diagram depicting the machine learning model filtering system of FIG. 6 applying one or more feature vectors of a file in filtering the machine learning models, to reduce the computational burden of a scoring engine in predicting users likely to access the file in accordance with some embodiments.

FIG. 7 is a system action diagram depicting the machine learning model filtering system 602 of FIG. 6 applying one or more feature vectors 118 of a file 202 in filtering the machine learning models 606, to reduce the computational burden of a scoring engine 612 in predicting users 106 likely to access the file 202. Aspects (e.g., features) of the file 202, as discussed above with reference to feature vectors 118, model features 116, user accesses, etc., are input to the feature vector generator 608, which outputs one or more feature vectors 118. The feature vector(s) 118 have values in some of the entries 408, 412, 416, 420, 422 (e.g., of the folder feature vector 406, token feature vector 410, extension feature vector 414, or user feature vector 418) that may or may not align with some of the weights 120 in some of the machine learning models 606. It is the task of the filtering module 610 to determine when this alignment occurs, and in which machine learning models 606. The filtering module 610 selects a subset 702 of machine learning models 606 for scoring with the file 202, and ignores, deselects or discards a further subset 704 of models not used for scoring with the file 202. In some embodiments, the filtering module 610 indexes for which users 106 and corresponding personalized machine learning models 606 a non-zero feature value of the feature vector(s) 118 has a non-trivial weight in a model 606.

One mechanism for selecting the subset 702 of machine learning models 606 is for the filtering module 610 to match non-zero features (i.e., non-zero values of the entries 408, 412, 416, 420, 422) of the feature vector(s) 118 to non-zero weights 120 in the machine learning models 606. For example, the filtering module 610 could select one or more models 606 that have more than a threshold number or amount of non-zero weights 120 corresponding to non-zero features of the feature vector(s) 118. The filtering module 610 could eliminate or deselect from further consideration all machine learning models 606 that have greater than a threshold number or amount of zero-weight entries corresponding to non-zero features of the feature vector(s) 118, and use or select from the remaining machine learning models 606 in some embodiments. Deselected machine learning models 606 are not applied to the feature vector(s) 118 for scoring. A threshold could be applied to the sum, product or other combination of the non-zero weights 120 corresponding to non-zero features, which may gauge a relative strength of interest, and the filtering module 610 could select those personalized machine learning models 606 that have such a sum or product greater than this threshold. To perform any of the above tasks, the filtering module 610 could correlate the weights 120 of each personalized machine learning model to entry values of each feature vector 118, and base the selecting on the results of the correlating.

It should be appreciated that the terms "non-zero weights" and "zero-weight entries" are relative to the model and type of model. For example, models that have a range of negative and positive weights 120 could be considered to have non-zero weights 120 that include positive weights 120 greater than a positive threshold value and include negative weights 120 greater in a negative direction than a negative threshold value. Weights 120 between the positive threshold value and the negative threshold value could be excluded as zero weights 120. Models that have weights 120 ranging between zero and one, inclusive, with one half indicating no correlation could be considered to have non-zero weights 120 that are greater by a first threshold amount than one half, or weights 120 lesser by a second threshold amount than one half. The weights 120 that are lower than one half could be considered negative weights 120. Weights 120 closer to one half than the first threshold amount or the second threshold amount could be considered as zero weights 120. Other weighting systems and other models could have interpretations of zero-weight entries and non-zero weights 120 relative to those models and weighting systems. Weights 120 can be considered odds ratios, in that a weight is related to the mathematical odds of probability in a model.

Using the selected subset 702 of machine learning models 606 determined by the filtering module 610, the scoring engine 612 produces scores 704 for the feature vector(s) 118 of the specific file 202 under consideration. Based on the scores 704 for the specific file 202, the access prediction module 604 determines a prediction 706 of which users 106 are likely to access the file 202. For example, depending on the scoring system, a score above a predetermined threshold and associated with a specific individualized machine learning model 606 could be associated with a specific user 106. This user 106 is more likely to access the file 202 than another user 106 for whom the individualized machine learning model 606 operating on the feature vector(s) 118 of the file 202 under consideration produces a lower score 704, e.g., below the predetermined threshold. Or, instead of using a predetermined score value threshold, scores 704 could be determined by the scoring engine 612, and the uppermost scores 704, e.g., a predetermined number of top scores 704, could be correlated to specific users 106. In a related manner, the system can predict which users are not likely to access the file 202, e.g., by looking for scores below a threshold, or the lowest scoring, or negative scores or anti-correlation, etc.

Information about the users 106 predicted likely to access the file 202 (e.g., the prediction 706) can be handled by the user interface 708 in various ways. For example, in one embodiment, the machine learning model filtering system 602 uses the user interface module 616 to communicate back to the user interface generator 124 of the file navigation assistance system 102, which represents information from the prediction 706 as discussed above with reference to FIG. 5, e.g., presenting recommended or proposed files 202 to specific users 106. In one embodiment, the machine learning model filtering system 602 generates the user interface 708 as described in FIG. 5. The system performs a repeat 710 for further files 202. This can be performed in sequence, or in parallel, or batches of files 202 and corresponding feature vectors 118, or combination thereof.

In one embodiment, the machine learning model filtering system 602 sends the information about the users 106 predicted likely to access the file 202 and/or information about users predicted not likely to access the file 202 to the risky or malicious user detection engine 126 of FIG. 1. The risky or malicious user detection engine 126 applies this information when monitoring user accesses to file 202, to recognize a file access by a user 106 that does not match the prediction 706. For example, if a user 106 who is predicted as not likely to access a specific file 202 nonetheless proceeds and accesses that file 202, this could be flagged as a possible risky or malicious action. In some embodiments, the system could look for a number of such accesses over a particular span of time, etc.

Figure 8:
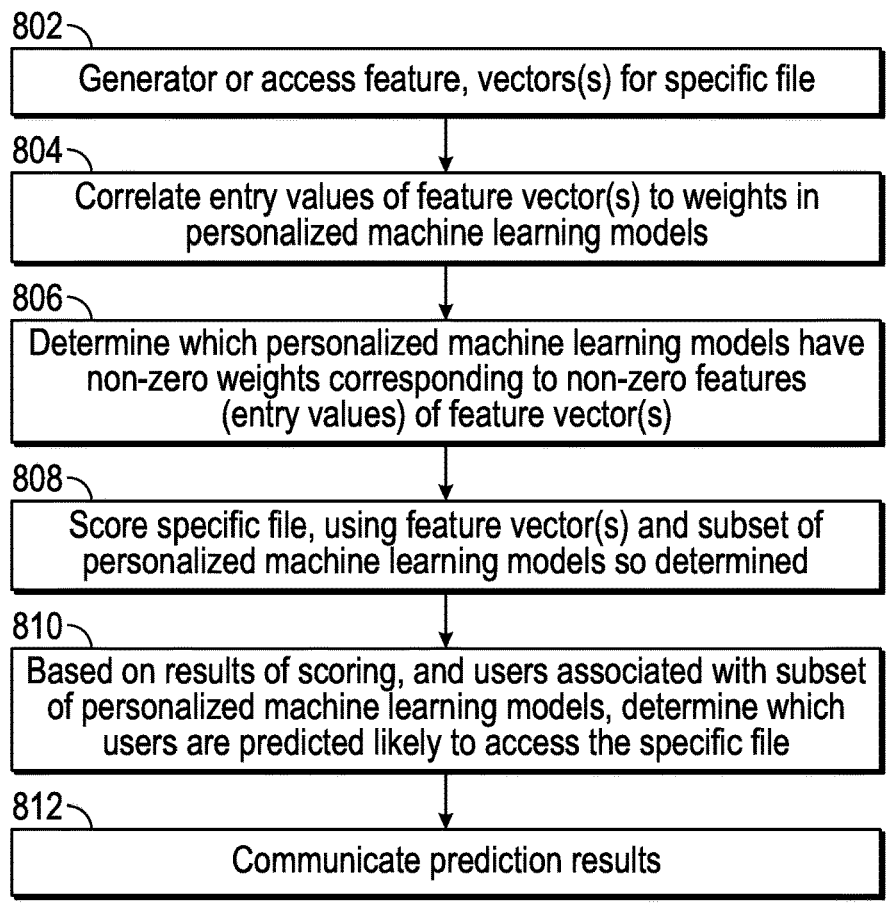
FIG. 8 is a flow diagram of a method for filtering personalized machine learning models, which can be practiced by a processor or a machine learning model filtering system in accordance with some embodiments.

FIG. 8 is a flow diagram of a method for filtering personalized machine learning models, which can be practiced by a processor or a machine learning model filtering system. The method is applicable to various models, feature vectors, training techniques, types of scores, and user interfaces as described above. In an action 802, one or more feature vectors are generated or accessed, for a specific file. For example, the system could generate the feature vectors for the specific file, or could access previously generated feature vectors for the specific file. In an action 804, entry values of the feature vector(s) are correlated to weights in personalized machine learning models that model user accesses to files in a file system. The correlating is part of analyzing the personalized machine learning models relative to the specific file. In an action 806, a determination is made of which personalized machine learning models have non-zero weights corresponding to non-zero features or entry values of feature vector(s). This determination is based on the analysis performed in the action 804. A threshold could be applied as to the number of such non-zero weights corresponding to non-zero features or the product of such non-zero weights, or another threshold or criterion could be devised.

In an action 808, the specific file for which the feature vector(s) were obtained is scored, using the feature vector(s) and the subset of personalized machine learning models determined in the action 806 to have non-zero weights corresponding to non-zero features or entry values of the feature vector(s). In an action 810, based on results of the scoring in the action 808, and based on the users associated with the subset of personalized machine learning models determined in the action 806, a determination is made as to which users are predicted likely to access the specific file. For example, a score from a particular personalized machine learning model, associated with a particular user, resulting from applying the model to the feature vector(s) for the specific file, could be above or below a threshold. If above the threshold, the user associated with the model is a user predicted likely to access the specific file.

In an action 812, prediction results are communicated. For example, the result that a user is predicted likely to access the specific file could be communicated to that user in the form of a user interface showing a representation of the file as recommended or proposed. Or, the information about users predicted likely to access a specific file could be sent to a risky or malicious user detection engine, along with information about which users are predicted not likely to access the specific file. The risky or malicious user detection engine could then track actual accesses, and compare to predicted accesses, in order to flag suspicious behavior.

Figure 9:
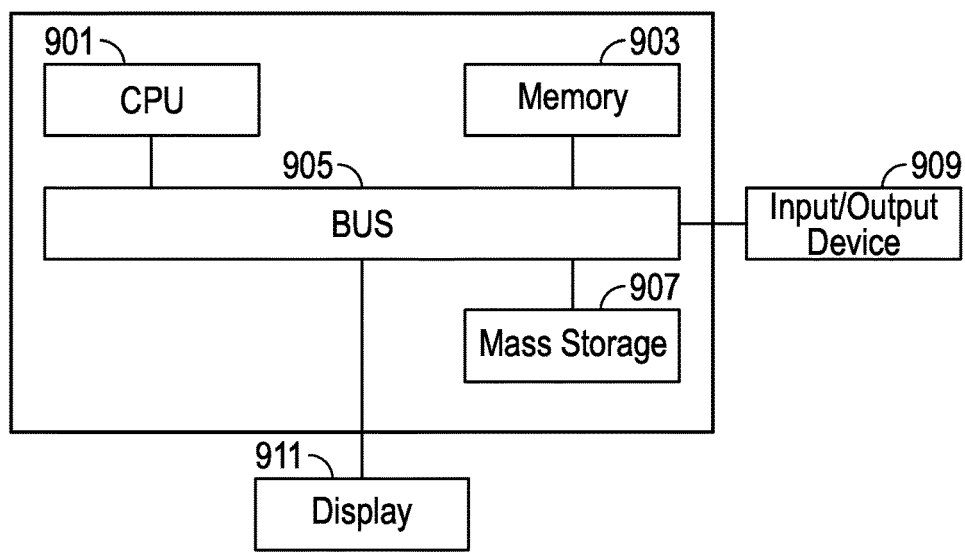
FIG. 9 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for a file navigation assistance system and/or a machine learning model filtering system in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein to enable the functionality described with reference to FIGS. 1-8. The code embodying this functionality may be stored within memory 903 or mass storage device 907 for execution by a processor such as CPU 901 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, performed by a processor, for filtering and reducing the number of machine learning models used in a file navigation assistance system, the method comprising:
   monitoring a group of users' accesses to a plurality of files within a file system;
   generating one or more feature vectors for each of the plurality of files within file system, wherein each of the one or more feature vectors provides information regarding one of the files within the plurality of files, and wherein the information provided identifies the users that have accessed each of the plurality of files within the file system;
   identifying, based on the feature vectors, relationships between individuals within the group of users, wherein the relationships between individuals are identified by recognizing common access by individuals within the group of users to files within the plurality of files;
   producing a plurality of machine learning models for the group of users, wherein:
      the plurality of machine learning models includes at least two separate and distinct machine learning models;
      the plurality of machine learning models are generated based on the monitoring of the group of users' accesses to the plurality of files, and
      the plurality of machine learning models are trained using the feature vectors of accessed files and the relationships identified between individuals within the group of users to develop positive weights that indicate preferences for individuals within the group of users;
   accessing at least one feature vector for a specific file;
   correlating the positive weights in the plurality of machine learning models with information regarding the specific file provided by the at least one feature vector;
   filtering the plurality of machine learning models to create a subset of machine learning models, wherein the subset of machine learning models:
      contains fewer machine learning models than the plurality of machine learning models,
      includes machine learning models that have positive weights corresponding to the information regarding the specific file provided by the at least one feature vector, and
      excludes machine learning models that lack positive weights corresponding to the information regarding the specific file provided by the at least one feature vector; and
   determining, based on the subset of machine learning models, the individuals likely to access the specific file.

2. The method of claim 1, wherein the plurality of machine learning models comprises two linear models that are of different model types from each other, wherein the model types are selected from: a feature learning model, a logistic regression model, a factorization model, a clustering model, a support vector machines model, a factorization machines model, a decision trees model, a random forest model, a classifier model or a naïve Bayes classifier model.

3. The method of claim 1, wherein the subset of machine learning models further excludes machine learning models that lack a threshold amount of positive weight corresponding to the information regarding the specific file provided by the at least one feature vector.

4. The method of claim 1, wherein the one or more feature vectors includes a plurality of fields populated with either a zero or a non-zero value entry that corresponds to a presence or an absence of an aspect in the one of the files within the plurality of files.

5. The method of claim 4, wherein the positive weights in the plurality of machine learning models are correlated with the non-zero value entries of the at least one feature vector of the specific file.

6. The method of claim 1, wherein the at least one feature vector for the specific file identifies a token of vocabulary that appears in a file path for the specific file.

7. The method of claim 1, wherein the at least one feature vector for the specific file identifies the file extension of the specific file.

8. A tangible, non-transitory, computer-readable media having instructions thereupon which, when executed by a processor, cause the processor to perform a method for filtering and reducing the number of machine learning models used in a file navigation assistance system, the method comprising:
   monitoring a group of users' accesses to a plurality of files within a file system;
   generating one or more feature vectors for each of the plurality of files within file system, wherein each of the one or more feature vectors provides information regarding one of the files within the plurality of files, and wherein the information provided identifies the users that have accessed each of the plurality of files within the file system;

identifying, based on the feature vectors, relationships between individuals within the group of users, wherein the relationships between individuals are identified by recognizing common access by individuals within the group of users to files within the plurality of files;

producing a plurality of machine learning models for the group of users, wherein:

the plurality of machine learning models includes at least two separate and distinct machine learning models;

the plurality of machine learning models are generated based on the monitoring of the group of users' accesses to the plurality of files, and the plurality of machine learning models are trained using the feature vectors of accessed files and the relationships identified between individuals within the group of users to develop positive weights that indicate preferences for individuals within the group of users;

accessing at least one feature vector for a specific file;

correlating the positive weights in the plurality of machine learning models with information regarding the specific file provided by the at least one feature vector;

filtering the plurality of machine learning models to create a subset of machine learning models, wherein the subset of machine learning models:

contains fewer machine learning models than the plurality of machine learning models, includes machine learning models that have positive weights corresponding to the information regarding the specific file provided by the at least one feature vector, and excludes machine learning models that lack positive weights corresponding to the information regarding the specific file provided by the at least one feature vector; and determining, based on the subset of machine learning models, the individuals likely to access the specific file.

9. The computer-readable media of claim 8, wherein the plurality of machine learning models comprises two linear models that are of different model types from each other, wherein the model types are selected from: a feature learning model, a logistic regression model, a factorization model, a clustering model, a support vector machines model, a factorization machines model, a decision trees model, a random forest model, a classifier model or a naïve Bayes classifier model.

10. The computer-readable media of claim 8, wherein the subset of machine learning models further excludes machine learning models that lack a threshold amount of positive weight corresponding to the information regarding the specific file provided by the at least one feature vector.

11. The computer-readable media of claim 8, wherein the one or more feature vectors includes a plurality of fields populated with either a zero or a non-zero value entry that corresponds to a presence or an absence of an aspect in the one of the files within the plurality of files.

12. The computer-readable media of claim 11, wherein the positive weights in the plurality of machine learning models are correlated with the non-zero value entries of the at least one feature vector of the specific file.

13. The computer-readable media of claim 8, wherein the at least one feature vector for the specific file identifies a token of vocabulary that appears in a file path for the specific file.

14. The computer-readable media of claim 8, wherein the at least one feature vector for the specific file identifies the file extension of the specific file.

15. A system for filtering and reducing the number of machine learning models used in a file navigation assistance system, the system comprising:

a memory storing programmed instructions; and a processor configured to execute the programmed instructions to:

monitor a group of users' accesses to a plurality of files within a file system;

generate one or more feature vectors for each of the plurality of files within file system, wherein each of the one or more feature vectors provides information regarding one of the files within the plurality of files, and wherein the information provided identifies the users that have accessed each of the plurality of files within the file system;

identify, based on the feature vectors, relationships between individuals within the group of users, wherein the relationships between individuals are identified by recognizing common access by individuals within the group of users to files within the plurality of files;

produce a plurality of machine learning models for the group of users, wherein:

the plurality of machine learning models includes at least two separate and distinct machine learning models;

the plurality of machine learning models are generated based on the monitoring of the group of users' accesses to the plurality of files, and the plurality of machine learning models are trained using the feature vectors of accessed files and the relationships identified between individuals within the group of users to develop positive weights that indicate preferences for individuals within the group of users;

access at least one feature vector for a specific file;

correlate the positive weights in the plurality of machine learning models with information regarding the specific file provided by the at least one feature vector;

filter the plurality of machine learning models to create a subset of machine learning models, wherein the subset of machine learning models:

contains fewer machine learning models than the plurality of machine learning models, includes machine learning models that have positive weights corresponding to the information regarding the specific file provided by the at least one feature vector, and excludes machine learning models that lack positive weights corresponding to the information regarding the specific file provided by the at least one feature vector; and determine, based on the subset of machine learning models, the individuals likely to access the specific file.

16. The system of claim 15, wherein the plurality of machine learning models comprises two linear models that are of different model types from each other, wherein the model types are selected from: a feature learning model, a logistic regression model, a factorization model, a clustering model, a support vector machines model, a factorization machines model, a decision trees model, a random forest model, a classifier model or a naïve Bayes classifier model.

17. The system of claim 15, wherein the subset of machine learning models further excludes machine learning models that lack a threshold amount of positive weight corresponding to the information regarding the specific file provided by the at least one feature vector.

18. The system of claim 17, wherein the one or more feature vectors includes a plurality of fields populated with either a zero or a non-zero value entry that corresponds to a presence or an absence of an aspect in the one of the files within the plurality of files.

19. The computer-readable media of claim 15, wherein the positive weights in the plurality of machine learning models are correlated with the non-zero value entries of the at least one feature vector of the specific file.

20. The computer-readable media of claim 15, wherein the at least one feature vector for the specific file identifies the file extension of the specific file or a token of vocabulary that appears in a file path for the specific file.

\* \* \* \* \*